June 20, 1944.  E. PICK  2,351,835

WATER TREATING APPARATUS

Filed June 4, 1942

INVENTOR:
Eric Pick

Patented June 20, 1944

2,351,835

UNITED STATES PATENT OFFICE 2,351,835

WATER TREATING APPARATUS

Eric Pick, New York, N. Y., assignor to The Permutit Company, New York, N. Y., a corporation of Delaware Application June 4, 1942, Serial No. 445,698

6 Claims. (Cl. 210—24)

This invention relates to water treating apparatus of the type in which the water is treated by flow through a bed of granular water treatment material, and it comprises an improved construction of and support for a rotary surface washer employed in such apparatus to maintain the bed in a clean and effective condition, all as more fully described hereinafter and as claimed.

As water flows downwardly through a bed of filter sand solid impurities are removed, mainly in the form of a blanket on top of the bed; but a substantial portion of the impurities also penetrates deep into the bed and forms a coating on the filter sand grains. In ion exchange or removal apparatus, such as zeolite water softeners, while intended to exchange or remove matter dissolved in the water, a similar action takes place, the extent depending on the amount of solid impurities present in the water.

In an attempt to remove these impurities it is common practice to backwash the bed periodically, i. e. to pass water through it upwardly to waste at a rate sufficiently high to expand the bed and make it fluid, and to cause the grains of sand or other granular water treatment material to rub against each other. Such backwashing, however, is not completely effective in removing all dirt penetrating into the bed and adhering to the grains. In the course of time such remaining dirt accumulates and causes the formation of agglomerations of grains and dirt into solid, ball shaped masses, so-called mudballs, which form dead spaces impassable to flow of water therethrough. Dirt accumulations also cause cracks in the bed and shrinkage of the bed from the sidewalls of the tank, opening up channels through which the water passes without being properly treated. All these phenomena not only seriously impair the effectiveness of filtering or otherwise treating the water, but they also permit the breeding and growth of certain organisms which may contaminate the water undergoing treatment.

Various devices have been proposed to supplement backwashing for a more effective cleansing of the bed, such as mechanical rakes, and air or steam distributing grids in the lower portion of the bed. While these arrangements improve matters they do not completely solve the problem because their performance is not uniformly satisfactory and depends to a large measure on the operator. Many of the devices used, moreover are too cumbersome and complicated for practical operation. Other devices which have come into use to cleanse the sand beds of gravity filters employ water jets directed toward the surface of the bed. One such arrangement, a rotary surface washer suggested by C. E. Palmer and described in a paper entitled "Revolving filter sand washer described at State College, Pa." (Water Works Engineering, volume 92, number 15, July 19, 1939) utilizes jets which revolve because of the reaction produced by the jets themselves.

It is an object of this invention to provide a rotary surface washer of improved design adapted to operate in closed water treating apparatus.

Another object is an improved construction of bearing and stuffing box for a rotary surface washer.

A further object is an improved arrangement for mounting a rotary surface washer in a closed water treatment apparatus.

The manner in which these objects are achieved is shown in the appended drawing in which—

Like numerals refer to like parts throughout the several views.

Figure 1:
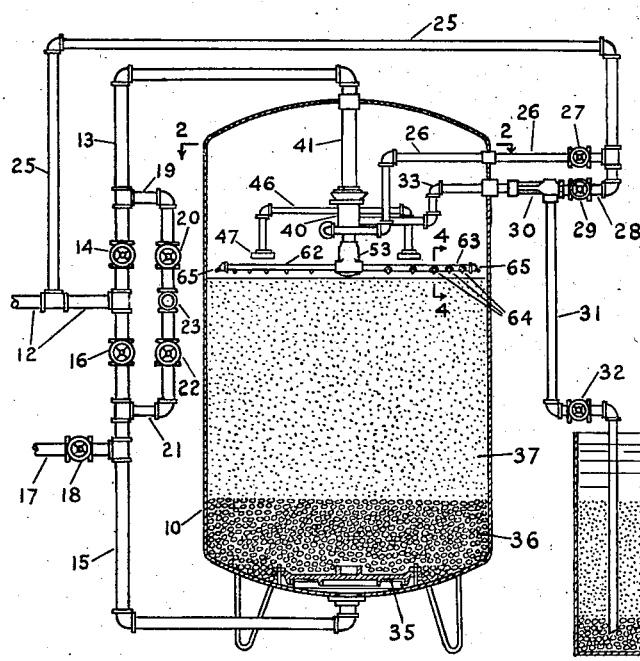
Fig. 1 is an elevation in section, more or less diagrammatic, of an apparatus according to my invention.

Referring now to Fig. 1, an upright cylindrical tank 10 is provided with an inlet pipe 12 for water to be treated. The pipe 12 has a branch pipe 13 leading to the top of tank 10 and provided with a valve 14, and a branch pipe 15 leading to the bottom of tank 10 and provided with a valve 16. A pipe 17, leading through a valve 18 to a point of use for treated water, is connected with pipe 15. A pipe 19 with valve 20 connects the branch pipe 13 with a pipe 23 leading to a point of waste, and a pipe 21 with a valve 22 connects the branch pipe 15 with the waste pipe 23. A pipe 25 leads from the inlet pipe 12 to a pipe 26 having a valve 27, and through a pipe 28 with a valve 29 to an injector 30 which has a discharge pipe 33 and a suction pipe 31 leading through a valve 32 to the lower portion of a salt tank 11.

On the bottom of tank 10 is mounted a deflector plate 35 in such manner that any water entering or leaving tank 10 through pipe 15 flows through a narrow annular passage around the periphery of the deflector plate 35. The lower portion of tank 10 contains a layer of gravel 36 which supports a bed of zeolite 37. On the bottom of the salt tank 11 is a layer of gravel 38 supporting a supply of salt 39.

Figure 3:
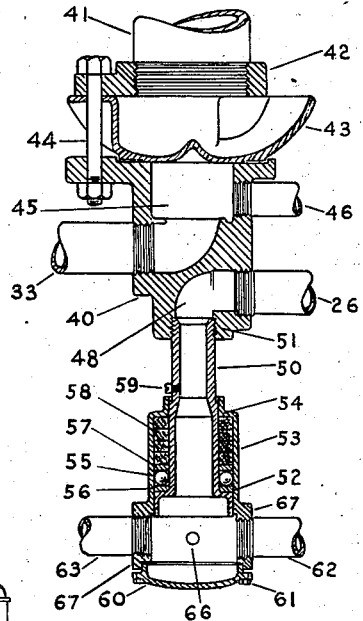
Fig. 3 is a section along line 3—3 of Fig. 2, on an enlarged scale.

Within the tank 10 is a pipe 41 having its upper end attached to the top head of the tank so as to be in communication with the branch pipe 13. The lower end of pipe 41 is screwed into a flange 42 (see Fig. 3). Below the flange 42 is a dished deflector plate 43, and below the plate 43 is a fitting 40, flange 42, plate 43 and fitting 40 being fastened together by means of bolts 44. Within the fitting 40 is a cavity 45 closed at the top by plate 43 and in communication with the injector discharge pipe 33. A plurality of pipes 46 lead from the cavity 45 to brine distributors 47 spaced uniformly above the top of the zeolite bed 37. While 3 pipes 46 and distributors 47 are shown in the drawing, this number is advantageously increased for tanks of relatively large diameter. Below the cavity 45 in fitting 40 is another cavity 48 which is in communication with the pipe 26.

A hollow cylindrical stator 50 has its upper end screwed at 51 into the fitting 40 so as to be in communication with the cavity 48. At its lower end the stator 50 has an outwardly extending flange 52. Rotatably mounted on the stator is a hollow cylindrical rotor 53 having an inside diameter slightly greater than the outside diameter of flange 52. At its upper end the rotor 53 has a flange 54 extending inwardly close to the body portion of the stator 50. Within the space bounded by the cylindrical inside surface of the rotor 53, the cylindrical outside surface of the stator 50, and the flanges 52 and 54 is a ball thrust bearing consisting of bronze balls 55, a lower race 56 resting on flange 52, and an upper race 57. The remainder of said space above the ball bearing is filled with packing rings 58. The rotor 53 is prevented by a stop screw 59 from sliding up on the stator 50 during handling and shipment. The lower end of the rotor 53 is closed by a removable cover plate 60 held in place by bolts 61.

Figure 2:
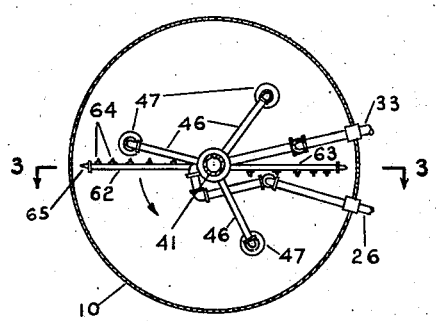
Fig. 2 is a section along line 2—2 of Fig. 1.
Figure 4:
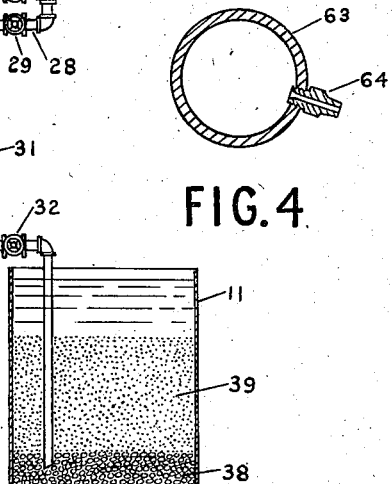
Fig. 4 is a section along line 4—4 of Fig. 1, likewise on an enlarged scale.

At its lower end, below the flange 52, the rotor 53 has a pair of bosses 67 into which are screwed pipe arms 62 and 63 each of which carries on one side (as shown in Fig. 2) a plurality of nozzles 64. The spacing between adjacent nozzles decreases outwardly from the center of the tank, and at its outer end each of the two pipe arms 62 and 63 has a nozzle 65. There is a similar nozzle 66 screwed into the side of the rotor 53 approximately on the center line of pipe arms 62 and 63, and at right angles thereto. The nozzles 64, 65 and 66 are inclined downwardly to the horizontal at an angle of about 15° to 20°, as shown in Fig. 4. The pipe arms 62 and 63 are located as close to the top of the zeolite bed 37 as is practical.

In normal operation, valves 14 and 18 are open, all other valves being closed. Raw water enters through pipes 12, 13 and 41, is horizontally deflected and distributed by plate 43, then is softened by downward flow through the zeolite bed 37, and finally leaves tank 10 by flowing around the periphery of the deflector plate 35 and through pipes 15 and 17 to a point of use. When the softening capacity of the zeolite has been exhausted the flow to service is stopped by closing valves 14 and 18.

As the initial step in the cycle of regenerating operations the bed is cleansed. First, valves 20 and 27 are opened. Raw water is now admitted through pipes 12, 25, 26 and cavity 48 to nozzle 66, and further through pipe arms 62 and 63 to nozzles 64 and 65. The number and size of the nozzles are so chosen that with a supply pressure of 50 to 100 pounds per square inch the water is discharged at a rate of about one-half to one gallon per minute per square foot of horizontal cross sectional area of the tank 10. The reaction forces resulting from the discharge of water through the nozzles 64 cause the rotor 53 with the pipe arms 62 and 63 to rotate in a counter-clockwise direction, as indicated by the arrow in Fig. 2. It will be observed that this direction of rotation tends to tighten the right hand threaded joint 51 between stator 50 and fitting 40. The rotating jets emanating from nozzles 64, 65 and 66 at a velocity of more than 100 feet per second effectively break up the entire dirt blanket collected on the surface of the zeolite bed 37. The water discharged by the nozzles flows upwardly around plate 43 and via pipes 41, 13, 20 and 23 to waste.

After about one to two minutes valve 16 is opened, admitting backwash water through pipes 12 and 15 to the bottom of the tank at a rate sufficient to make the bed 37 fluid without, however, expanding it appreciably. Backwashing and surface washing now proceed simultaneously, and during this time the entire bed is thoroughly cleansed. Due to the flow of backwash water the bed is in a loosened and fluid condition so that the rotating surface wash jets are given an opportunity to penetrate deeply into the bed, rolling it over and agitating it, and, in the course of time reaching and effectively scouring every single grain. After about 5 to 10 minutes valve 27 is closed, stopping the surface wash. The flow of backwash water alone is then continued for about one more minute to regrade and level off the bed. Then valves 16 and 20 are closed.

The cleansed bed is now regenerated by opening valves 29, 32 and 22 so that raw water flows via pipes 12, 25 and 28 to the injector 30, drawing brine through pipe 31 from salt tank 11. The dilute brine discharged by the injector 30 passes through pipe 33, cavity 45, pipes 46 and brine distributors 47 into the tank 10, downwardly through the bed 37, and to waste via pipes 15, 21 and 23. When the required amount of brine has been introduced, valves 29 and 32 are closed and valve 14 is opened so that raw water now enters through pipes 12, 13 and 41, rinsing the spent brine from the bed 37 and flowing to waste through pipes 15, 21 and 23. When the bed 37 has been rinsed free of all brine, valve 22 is closed and valve 18 opened, restoring the softener once more to normal service.

While I have illustrated and described my invention with particular reference to a sodium zeolite water softener it may, of course, also be used with water treatment equipment based on hydrogen ion exchange or on the removal or exchange of anions.

My invention is particularly useful in water filters. In that case the zeolite bed 37 is replaced by a bed of filter sand, and the salt tank 11 as well as the injector 30 with their associated pipes and fittings are omitted. The operation is analogous to that described above for a water softener. In cleansing the bed, the surface wash is first operated alone for one to two minutes, then concurrently with the backwash for 5 to 10 minutes, and finally the backwash water alone is allowed to flow for about one minute. The regenerating step is, of course, omitted, but the rinse operation, in a filter generally referred to as filterto-waste step, is used to remove the raw water left in the sand and gravel voids at the termination of the backwashing operation.

For good operation the surface wash water should be supplied under a pressure of 50 to 75 pounds per square inch. When such pressure is not available, a suitable booster pump must be provided. Unless the water supplied to the rotary surface washer is free of relatively large suspended particles, the installation of a strainer in pipe 25 is recommended in order to catch such impurities which might clog the nozzles.

A filter or other water treating apparatus equipped with a surface wash system according to my invention and operated as described, will remain permanently clean and efficient. Even an installed water treatment unit with a dirty and contaminated bed can readily be cleaned in short order by the installation of my rotary surface washer; in such cases it will often eliminate the task of unloading the unit and cleaning the water treatment material extraneously which not only is costly but also entails an appreciable loss of material.

A further advantage of the rotary surface wash system is that it saves wash water because both the rate of flow and the duration of backwashing can be substantially reduced.

It will be noted that in my construction the packing material 58 is compressed by a force consisting of the weight of the rotor 53 and the pipe arms 62 and 63, plus a force consisting of the water pressure acting downwardly on an area equal to the cross sectional area of the stator 50. Thus, the force compressing the packing 58 remains constant which means that the correct functioning of the washer cannot become impeded either by an excessive tightening of the stuffing box which would interfere with free rotation of the surface washer, nor by leakage which would reduce the strength of the jets. This is particularly important in closed water treatment units of the pressure type where the operation of the washer cannot be observed, although my system is, of course, well suited for use in equipment of the gravity type.

The means of support for the rotary surface washer disclosed herein, joined with the deflector plate 43 and, in the case of regenerative water treatment apparatus, with means for distributing the regenerant solution make for a neat, compact and efficient design.

While I have shown what I consider the preferred form of my invention, modifications may be made without departing from its spirit, and reference is, therefore, made to the appended claims for a definition of the scope of my invention.

What I claim is:

1. A water treating apparatus comprising a tank containing a bed of granular water treatment material and having valved inlet and outlet pipes communicating with said tank on opposite sides of the bed, one of said pipes extending through the top of said tank, deflector means for alternately distributing water received from an outside source and collecting water and discharging it to waste, mounted within said tank adjacent the end of said one pipe, a fitting attached to said means, and a rotary surface washer comprising a stator supported on said fitting, a connection extending from said inlet pipe through said fitting to said stator, and a rotor rotatably mounted on said stator and provided with means for causing said rotor to rotate and for agitating said bed, said last named means comprising pipe arms extending laterally from said rotor and nozzles mounted on one side of each of said pipe arms.

2. A water treating apparatus comprising a tank containing a bed of granular water treatment material and having valved inlet and outlet pipes communicating with said tank on opposite sides of the bed, one of said pipes extending through the top of said tank, deflector means for distributing and collecting water mounted within said tank on the end of said one pipe in spaced relation thereto, a fitting attached to said means, and a rotary surface washer comprising a stator supported on said fitting, a connection extending from said inlet pipe through said fitting to said stator, and a rotor rotatably mounted on said stator and provided with means for causing said rotor to rotate and for agitating said bed, said last named means comprising pipe arms extending laterally from said rotor and nozzles mounted on one side of each of said pipe arms.

3. A water treating apparatus comprising a tank containing a bed of granular water treatment material and having valved inlet and outlet pipes communicating with said tank on opposite sides of the bed, one of said pipes extending through the top of said tank, deflector means for distributing and collecting water mounted within said tank adjacent the end of said one pipe, and a rotary surface washer comprising a hollow stator supported within said tank below said means and having a cylindrical portion and a flange, a hollow rotor rotatably mounted on said stator and having a cylindrical portion and a flange, packing material within a space bounded by said cylindrical portions and said flanges, said packing material being compressed by the weight of said rotor, laterally extending pipe arms on said rotor, nozzles mounted on one side of each of said pipe arms, and a connection communicating with said inlet pipe for supplying water to said stator.

4. A water treating apparatus comprising a tank containing a bed of granular water treatment material, water collecting means mounted within said tank near its top, a waste pipe connected with said collecting means, an inlet pipe connected with the lower portion of said tank, a rotary self-propelling surface washer mounted within said tank below said collecting means and comprising a hollow stator having a cylindrical portion and a flange, means for supporting the upper end of said stator, a hollow rotor rotatably mounted on said stator and having a cylindrical portion and a flange, packing material within a space bounded by said cylindrical portions and said flanges, said packing material being compressed by the weight of said rotor, laterally extending pipe arms on said rotor, nozzles mounted on one side of each of said pipe arms, and means for supplying water under pressure to said stator.

5. A water treating apparatus comprising a a tank containing a bed of granular water treatment material, water collecting means mounted within said tank near its top, a waste pipe connected with said collecting means, an inlet pipe connected with the lower portion of said tank, a rotary self-propelling surface washer mounted within said tank below said collecting means and comprising a stator having a passage for water extending longitudinally therethrough, means for supporting the upper end of said stator, a cylindrical outside surface on said stator, an externally extending flange near the lower end of said stator, a hollow rotor adapted to slide over said stator and having an internal cylindrical surface closely spaced from the periphery of said externally extending flange, an internal flange near the upper end of the rotor and extending close to said cylindrical outside surface, packing material within the space bounded by said cylindrical surfaces and said flanges, a cover closing the lower end of said rotor, laterally extending pipe arms on said rotor, nozzles mounted on one side of each of said pipe arms, and means for supplying water under pressure to said stator.

6. A water treating apparatus comprising a tank containing a bed of granular water treatment material, water collecting means mounted within said tank near its top, a waste pipe connected with said collecting means, an inlet pipe connected with the lower portion of said tank, a rotary self-propelling surface washer mounted within said tank below said collecting means and comprising a stator having a passage for water extending longitudinally therethrough, means for supporting the upper end of said stator, a cylindrical outside surface on said stator, an externally extending flange near the lower end of said stator, a hollow rotor adapted to slide over said stator and having an internal cylindrical surface closely spaced from the periphery of said externally extending flange, an internal flange near the upper end of the rotor and extending close to said cylindrical outside surface, a ball thrust bearing and packing material within the space bounded by said cylindrical surfaces and said flanges and compressed by the weight of the rotor, a cover closing the lower end of said rotor, laterally extending pipe arms on said rotor, nozzles mounted on one side of each of said pipe arms, and means for supplying water under pressure to said stator.

ERIC PICK.